US009980111B2

United States Patent
Miyata et al.

(10) Patent No.: US 9,980,111 B2
(45) Date of Patent: May 22, 2018

(54) MOBILE TERMINAL DEVICE, CALL-TO-ACTION SYSTEM, CALL-TO-ACTION METHOD, CALL-TO-ACTION PROGRAM, AND SAFETY VERIFICATION SYSTEM

(71) Applicants: Akira Miyata, Kumamoto (JP); Yasuhiro Soshino, Kumamoto (JP)

(72) Inventors: Akira Miyata, Kumamoto (JP); Yasuhiro Soshino, Kumamoto (JP)

( * ) Notice: Subject to any disclaimer, the term of this patent is extended or adjusted under 35 U.S.C. 154(b) by 0 days. days.

(21) Appl. No.: 15/048,554

(22) Filed: Feb. 19, 2016

(65) Prior Publication Data
US 2016/0249194 A1 Aug. 25, 2016

Related U.S. Application Data

(63) Continuation of application No. PCT/JP2014/075393, filed on Sep. 25, 2014.

(30) Foreign Application Priority Data

Sep. 27, 2013 (JP) ................................. 2013-202334

(51) Int. Cl.
*H04W 4/22* (2009.01)
*H04M 11/04* (2006.01)
(Continued)

(52) U.S. Cl.
CPC .............. *H04W 4/22* (2013.01); *G01C 21/36* (2013.01); *G06F 3/0481* (2013.01);
(Continued)

(58) Field of Classification Search
CPC .......... H04W 4/22; H04W 4/02; G01C 12/36; G06F 3/0481; G06F 3/0484; G08B 25/10; G08B 7/066; G08B 27/00; H04M 11/045
(Continued)

(56) References Cited

U.S. PATENT DOCUMENTS

2003/0162557 A1* 8/2003 Shida ...................... H04M 3/42
455/521
2005/0190053 A1* 9/2005 Dione .................... G06Q 10/06
340/500
(Continued)

FOREIGN PATENT DOCUMENTS

CN 101466085 A 6/2009
CN 101567939 A 10/2009
(Continued)

OTHER PUBLICATIONS

International Search Report dated Dec. 22, 2014 from Corresponding International Application No. PCT/JP2014/075393.

*Primary Examiner* — Kamran Afshar
*Assistant Examiner* — Farid Seyedvosoghi
(74) *Attorney, Agent, or Firm* — Duquette Law Group, LLC

(57) ABSTRACT

Provided are a mobile terminal device and a safety verification system by which information for verifying safety can be collected and presented, while prompting evacuation. The device is provided with: a current location acquisition unit for acquiring the current location when disaster occurrence information has been received; a route display controller for displaying a route leading from the acquired current location to a preregistered evacuation site; a start display controller for displaying a start input screen via which an input indicating that evacuation has started can be entered; and an evacuation start information transmission unit which, in the event that evacuation start information indicating that evacuation has started has been input from the start input screen through an operation by the user, transmits the evacuation start information to a preregistered destination.

11 Claims, 12 Drawing Sheets

(51) Int. Cl.
   *G08B 7/06*   (2006.01)
   *G01C 21/36*   (2006.01)
   *G06F 3/0481*   (2013.01)
   *G06F 3/0484*   (2013.01)
   *G08B 25/10*   (2006.01)
   *H04W 4/02*   (2018.01)
   *G08B 27/00*   (2006.01)

(52) U.S. Cl.
   CPC ............ *G06F 3/0484* (2013.01); *G08B 7/066* (2013.01); *G08B 25/10* (2013.01); *H04M 11/045* (2013.01); *H04W 4/02* (2013.01); *G08B 27/00* (2013.01)

(58) Field of Classification Search
   USPC .............. 455/404, 404.2, 521, 414.2, 601; 715/719; 701/533
   See application file for complete search history.

(56) References Cited

U.S. PATENT DOCUMENTS

2007/0049259 A1* 3/2007 Onishi ............... A62B 99/00
                                                        455/414.2
   2009/0177644 A1* 7/2009 Martinez ............. G06Q 30/02
   2009/0309742 A1  12/2009 Alexander et al.
   2011/0136463 A1   6/2011 Ebdon et al.
   2012/0302199 A1  11/2012 Yamashita
   2015/0213212 A1*  7/2015 Grimley ............ G06F 3/04817
                                                        715/719

FOREIGN PATENT DOCUMENTS

| EP | 2076090 A1 | 7/2009 |
   |---|---|---|
   | JP | 2003242580 A | 8/2003 |
   | JP | 2004048094 A | 2/2004 |
   | JP | 2005251088 A | 9/2005 |
   | JP | 2007147340 A | 6/2007 |
   | JP | 2008257711 | 10/2008 |
   | JP | 2009288843 A | 12/2009 |
   | JP | 2011019199 | 1/2011 |
   | JP | 2011237917 A | 11/2011 |
   | JP | 2013105223 A | 5/2013 |
   | JP | 2013157022 A | 8/2013 |
   | KR | 20120130427 A | 12/2012 |

* cited by examiner

MOBILE TERMINAL DEVICE, CALL-TO-ACTION SYSTEM, CALL-TO-ACTION METHOD, CALL-TO-ACTION PROGRAM, AND SAFETY VERIFICATION SYSTEM

RELATED APPLICATIONS

This patent application is a continuation of, and claims the benefit of, PCT International Application No. PCT/JP2014/075393, filed on Sep. 25, 2014, entitled, "MOBILE TERMINAL DEVICE, CALL-TO-ACTION SYSTEM, CALL-TO-ACTION METHOD, CALL-TO-ACTION PROGRAM, AND SAFETY CONFIRMATION SYSTEM," which claims priority to Japanese Patent Application No. 2013-202334, filed on Sep. 27, 2013 the contents and teachings of each of which are hereby incorporated by reference in their entirety.

FIELD

The present invention relates to a call-to-action system for prompting call-to-action by an initiative action based on information for calling forth an action, for example.

BACKGROUND

From the experience of the Great Hanshin-Awaji Earthquake and the Great East Japan Earthquake, a variety of researches and developments about a response in case that a natural disaster occurs, have been promoted. Among them, especially as the fact which became apparent from the experience of the Great East Japan Earthquake, it was found that there were so many people who had been visited by being engulfed by tsunami and the like while conducting confirmation of the safety of close persons using mobile phones and smartphones. That is, in case that a natural disaster occurs, many people would put confirmation of the safety of close persons before their own evacuation, which results in a problem of expanding damage.

Along with such a problem, the importance of "initiative evacuees" has been also discussed in recent years. That is, if there is such a person who takes initiative and evacuates, people around such a person also start to evacuate therewith, so that evacuation is put before safety confirmation and it is possible to prevent the damage from spreading. That is, not applying only to the action of evacuation, it has been found that, when someone takes the initiative to perform predetermined actions, there are many people who are urged by those actions and take similar actions.

Here, techniques as shown in Patent Literatures 1 and 2 are disclosed as techniques relating to safety confirmation. The technique as shown in Patent Literature 1 includes a center computer, which is provided with: a personal information storage unit 15 that stores personal information; a group information storage unit 12 that stores group information to which the personal information belongs; a disaster victim data storage unit 9 that stores disaster victim data transmitted from an input device; a safety inquiry data reception unit 10 that receives safety inquiry data including personal information of the disaster victim; a group search unit 11 that searches, based on the personal information and the group information included in the safety inquiry data, a group to which the personal information belongs; and a safety information response unit 14 that replies, based on member information belonging to the searched group and the disaster victim data, safety data of the members.

The technique as shown in Patent Literature 2 includes an information processing apparatus 10, which: goes into a quake mode by acquisition of disaster information such as Earthquake Early Warning to be issued when a large-scale disaster occurs; extracts designated information (phone number, for example) required when obtaining safety confirmation information from a disaster information processing server 40, from a telephone book and the like stored in a mobile terminal 30 connected, based on a predetermined condition; obtains the safety confirmation information from the disaster information processing server 40 using the designated information; extracts personal information (such as name and phone number of an owner of the mobile terminal) which can be registered as the safety confirmation information from the connected mobile terminal 30 to the disaster information processing server 40, based on a predetermined condition; and registers the extracted personal information in the disaster information processing server 40 as the safety confirmation information.

Further, such a technique as Twitter™ that posts and delivers one's own comments and the like to many and unspecified persons and/or particular persons has been commonly used in recent years.

CITATION LIST

Patent Literature 1: Japanese Patent Application Laid-Open No. 2008-257711
Patent Literature 2: Japanese Patent Application Laid-Open No. 2011-19199

SUMMARY

Technical Problem

However, the techniques as shown in Patent Literatures 1 and 2 can carry out entering personal information and safety confirmation with a simple operation, but still have the above-mentioned problem in terms of urging in preference for evacuation instead of safety confirmation, which may lead to expansion of damage.

The present invention provides a mobile terminal device and a safety confirmation system that can collect and provide information for safety confirmation while urging evacuation, and further provides a call-to-action system that identifies an initiative actor by analyzing a predetermined action.

Solution to Problem

A mobile terminal device according to the present invention is provided with: a trigger information reception unit that receives trigger information that triggers calling forth a predetermined action; a start display control unit that displays a start entry screen for entering an input that the predetermined action has started; and an action start information transmission unit that transmits, when action start information indicating that the predetermined action has started is entered from the start entry screen by an operation of a user, the action start information to a pre-registered destination.

Thus, the mobile terminal device according to the present invention transmits, when receiving trigger information that triggers calling forth a predetermined action, information that a user has started the action, to a pre-registered destination, so that it has an advantageous effect that it is possible to urge other person to act and it is possible to take action as an initiative actor.

The mobile terminal device according to the present invention is configured such that: the trigger information is disaster occurrence information that is delivered when a disaster has occurred; the mobile terminal device further comprises: a current location acquisition unit that acquires a current location when the disaster occurrence information has been received; and a route display control unit that displays a route that leads from the acquired current location to a pre-registered evacuation site; the start display control unit displays a start entry screen for entering an input that evacuation has started; and the action start information transmission unit transmits, when evacuation start information indicating that the evacuation has started is entered from the start entry screen, the evacuation start information to the destination.

Thus, the mobile terminal device according to the present invention acquires a current location when the disaster occurrence information has been received, displays a route that leads from the acquired current location to a pre-registered evacuation site, displays a start entry screen for entering an input that evacuation has started, and transmits, when evacuation start information indicating that the evacuation has started is entered from the start entry screen by an operation of a user, the evacuation start information to the pre-registered destination, so that it has an advantageous effect that it is possible to collect information indicating that the evacuation has started and utilize it as safety information and it is possible to urge the user to evacuate.

The mobile terminal device according to the present invention is configured such that the evacuation start information is transmitted to a safety confirmation device that aggregates pre-registered safety confirmation information.

Thus, in the mobile terminal device according to the present invention, the evacuation start information is transmitted to a safety confirmation device that aggregates pre-registered safety confirmation information, so that it has an advantageous effect that it is possible to manage the evacuation start information at the safety confirmation device as safety information.

The mobile terminal device according to the present invention is configured such that the evacuation start information is transmitted simultaneously to a part or all of destinations registered in the mobile terminal device.

Thus, in the mobile terminal device according to the present invention, the evacuation start information is transmitted simultaneously to a part or all of destinations registered in the mobile terminal device, so that it has an advantageous effect that it is possible to inform easily a close person(s), for example, of his/her having started evacuation and it is possible to know easily that a close person(s) has started evacuation.

Further, by informing quickly other person(s) that he/she has started to evacuate, it has an advantageous effect that it is possible to serve as an initiative evacuee and it is possible to induce making evacuation a top priority.

The mobile terminal device according to the present invention is configured such that when the evacuation start information has been received from another mobile terminal device that is pre-registered, an evacuation situation of the other mobile terminal device is displayed.

Thus, the mobile terminal device according to the present invention displays, when the evacuation start information has been received from another mobile terminal device that is pre-registered, an evacuation situation of the other mobile terminal device, so that it has an advantageous effect that it is possible to know as needed that other person(s) has started evacuation and it is possible to concentrate on evacuation while confirming safety.

A safety confirmation system according to the present invention is provided with: the mobile terminal device; a shelter terminal device placed in the evacuation site; and a safety confirmation device that aggregates safety confirmation information, wherein the mobile terminal device comprises: an output unit that outputs information for identifying the user and information for identifying a safety confirmation target person of the user, both items of information being pre-registered, the shelter terminal device comprises: an acquisition unit that acquires the information for identifying the user and the information for identifying the safety confirmation target person of the user, both items of information being outputted from the mobile terminal device; and a transmission unit that transmits the acquired information with additional information on a shelter in which the shelter terminal device is placed, to the safety confirmation device, and the safety confirmation device comprises: a storage unit that stores information for identifying the user and information for indicating a safety state of the user; a registration unit that registers, when receiving the information for identifying the user, the safety state of the user in the storage unit as a state in which evacuation has been completed; and a transmission unit that extracts, when receiving the information for identifying the safety confirmation target person, information for indicating a safety state of the safety confirmation target person from the storage unit based on the received information, and for transmitting the extracted information to the shelter terminal device and/or the mobile terminal device.

Thus, in the safety confirmation system according to the present invention, when the user arrives at the shelter and passes his/her own information to the shelter terminal device placed therein, this information is registered in the safety confirmation device as a state that evacuation has been completed, and information on the safety state of the safety confirmation target person can be obtained together, so that it has an advantageous effect that it is possible to register user's own safety information and conduct confirmation of the safety of other person(s). Further, it is possible to conduct confirmation of the safety of other person(s) by passing his/her own information to the shelter terminal device, so that it has an advantageous effect that it is possible to induce users to shelters fast.

The safety confirmation system according to the present invention is configured such that: the output unit of the mobile terminal device encodes the information for identifying the user and the information for identifying the safety confirmation target person of the user and displays a resulting code on a screen; and the acquisition unit of the shelter terminal device acquires the information for identifying the user and the information for identifying the safety confirmation target person of the user by reading the code displayed on the mobile terminal device.

Thus, in the safety confirmation system according to the present invention, the output unit of the mobile terminal device encodes the information for identifying the user and the information for identifying the safety confirmation target person of the user and displays a resulting code on a screen, and the acquisition unit of the shelter terminal device acquires the information for identifying the user and the information for identifying the safety confirmation target person of the user by reading the code displayed on the mobile terminal device, so that it has an advantageous effect that it is possible to carry out information passing from the mobile terminal device to the shelter terminal device smoothly at the shelter and it is possible to improve efficiency of the processing.

The safety confirmation system according to the present invention is configured such that: the output unit of the mobile terminal device outputs a time from when the mobile terminal device receives the disaster occurrence information till when the acquisition unit of the shelter terminal device acquires the information, imaging information that the mobile terminal device has captured since receiving the disaster occurrence information, a migration pathway of the mobile terminal device since receiving the disaster occurrence information, and/or voice information that the mobile terminal device has recorded since receiving the disaster occurrence information; and the acquisition unit of the shelter terminal device acquires each item of information outputted by the output unit along with the information for identifying the user and the information for identifying the safety confirmation target person of the user.

Thus, in the safety confirmation system according to the present invention, the output unit of the mobile terminal device outputs a time from when the mobile terminal device receives the disaster occurrence information till when the acquisition unit of the shelter terminal device acquires the information, imaging information that the mobile terminal device has captured since receiving the disaster occurrence information, a migration pathway of the mobile terminal device since receiving the disaster occurrence information, and/or voice information that the mobile terminal device has recorded since receiving the disaster occurrence information, and the acquisition unit of the shelter terminal device acquires each item of information outputted by the output unit along with the information for identifying the user and the information for identifying the safety confirmation target person of the user, so that it has an advantageous effect that it is possible to maximally collect information that can be obtained by the mobile terminal device and it is possible to use the collected information for the understanding of disaster situation, material of research and development, and payment of insurance during reconstruction, for example.

A call-to-action system according to the present invention is provided with: the mobile terminal device; and an action analysis device that receives information on the predetermined action from the mobile terminal device and manages and aggregates the received information, wherein the mobile terminal device comprises a migration information transmission unit that transmits migration information on a migration state of the mobile terminal device to the action analysis device, and the action analysis device comprises: an action analysis unit that analyzes an action since receiving the trigger information for each mobile terminal device, based on the transmitted migration information; and an initiative actor identification unit that identifies the mobile terminal device of an initiative actor based on the analyzed action.

Thus, the call-to-action system according to the present invention analyzes an action since receiving the trigger information for each mobile terminal device, based on the migration information on a migration state of the mobile terminal device, and identifies the mobile terminal device of an initiative actor based on the analyzed action, so that it has an advantageous effect that it is possible to promote various call-to-actions using initiative actors.

The call-to-action system according to the present invention is configured such that the action analysis unit analyzes a time from when the action analysis device receives the trigger information included in the migration information till when the action analysis device starts to migrate, a migration speed, a relationship of position/speed relative to another migrating mobile terminal device, and/or a time from when the predetermined action starts till when the predetermined action is completed.

Thus, the call-to-action system according to the present invention analyzes a time from when the action analysis device receives the trigger information included in the migration information till when the action analysis device starts to migrate, a migration speed, a relationship of position/speed relative to another migrating mobile terminal device, and/or a time from when the predetermined action starts till when the predetermined action is completed, so that it has an advantageous effect that it is possible to accurately identify the initiative actors.

The call-to-action system according to the present invention is configured such that the action analysis unit analyzes a number of cases where mobile terminal devices, destinations to which action start information indicating that the predetermined action has started is delivered, have started the predetermined action based on the trigger information.

Thus, the call-to-action system according to the present invention analyzes a number of cases where mobile terminal devices, destinations to which action start information indicating that the predetermined action has started is delivered, have started the predetermined action based on the trigger information, so that it has an advantageous effect that it is possible to estimate how much effect it has on action of other person and accurately identify the initiative actors.

The call-to-action system according to the present invention is configured such that the trigger information is disaster occurrence information that is delivered when a disaster has occurred, and is further provided with an initiative evacuation information transmission unit that transmits, when the trigger information has been received, information for urging initiative evacuation to the mobile terminal device of the initiative actor identified by the initiative actor identification unit.

Thus, in the call-to-action system according to the present invention, the trigger information is disaster occurrence information that is delivered when a disaster has occurred, and it transmits, when the trigger information has been received, information for urging initiative evacuation to the mobile terminal device of the initiative actor identified by the initiative actor identification unit, so that it has an advantageous effect that it is possible to induce evacuation of more people by urging a person(s) who has the characteristics as an initiative actor to take initiative and evacuate first.

DETAILED DESCRIPTION

Figure 1:
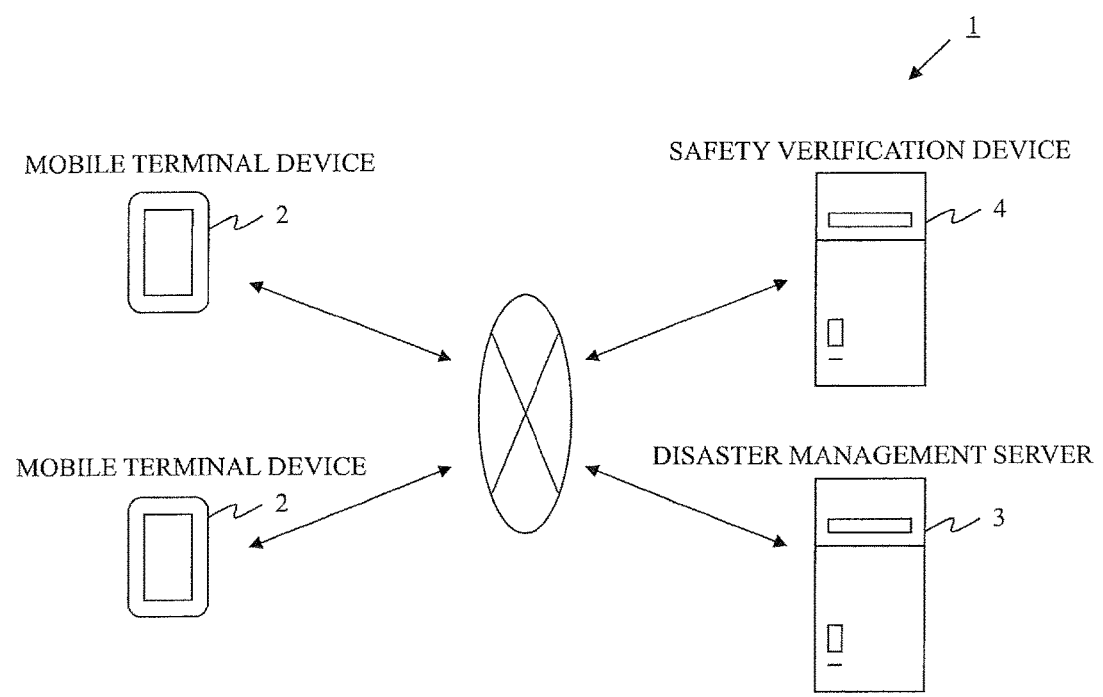
FIG. 1 is a system configuration diagram of an evacuation management system using a mobile terminal device according to the first embodiment.

The embodiments of the present invention will be described below. The same reference numerals are given to the same elements throughout all of the embodiments.

First Embodiment of the Invention

A mobile terminal device according to this embodiment will be described with reference to FIG. 1 to FIG. 5. The mobile terminal device according to the embodiment is configured to display an evacuation route and collect information on an evacuation situation to use as safety information when it is necessary to evacuate due to the occurrence of a natural disaster. The mobile terminal device can communicate with other devices by connecting to the Internet.

One of the major problems when natural disasters occur is that a network of telephone and the Internet becomes congested and a call or communication is not enabled. From the experience of the past earthquakes and the like, it has been found that lines of contact and lines of communication could be used without any trouble for several minutes to several ten minutes after disasters occurred. In addition, since each telephone company is promoting improvement of lines of contact and lines of communication, it is considered that, in the future, lines of contact and lines of communication can be used without any trouble even in case that a disaster occurs. However, due to such improvement of the line utilization, such a problem now arises that people who put safety confirmation by e-mail or telephone before evacuation increase and damage spreads.

Therefore, it is necessary to induce people to first make it a top priority to evacuate by themselves and then conduct the confirmation of safety when a disaster occurs. It should be noted that it is ideal to evacuate between several minutes and several ten minutes which can use the lines without any trouble and, thereafter, conduct safety confirmation using network and the like reserved at a shelter. The mobile terminal device according to the present embodiment first displays an evacuation route when a disaster occurs, to urge the user to evacuate, while entering and transmitting information that the user started evacuation by the operation of the user, and, thereby, utilizes that information as safety information and informs close persons that the user started evacuation for reassurance.

FIG. 1 is a system configuration diagram of an evacuation management system using a mobile terminal device according to the present embodiment. An evacuation management system 1 is provided with: a mobile terminal device(s) 2 each owned by a user and on which a disaster response application for causing the device to function as an input/output device, an information management device, and an arithmetic device when a disaster occurs is installed; a disaster management server 3 that performs information management and arithmetic processing necessary for getting the disaster response application to work; and a safety confirmation device 4 that manages safety information for safety confirmation. These devices are connected through telecommunications line to transfer information there between.

For example, when receiving such a notification as an Earthquake Early Warning at the mobile terminal device 2, this reception triggers acquiring a current location of the mobile terminal device 2 and sending it to the disaster management server 3. The disaster management server 3 performs, from the acquired current location, a selection of an optimal evacuation site and a calculation of an evacuation route for the user of the mobile terminal device 2. Information on the calculated evacuation site and evacuation route is sent to the mobile terminal device 2 and displayed on the screen of the mobile terminal device 2 together with map information. In addition, on the screen of the mobile terminal device 2 is also displayed together an entry screen for entering an input that evacuation has started. The user of the mobile terminal device 2 enters an input that evacuation has started and performs evacuation along the evacuation route. The entered information indicating the start of evacuation is transmitted to the safety confirmation device 4 that manages safety information. The safety confirmation device 4 registers the transmitted information as the safety information. At this point, it is registered with the state of "evacuation started." When the information indicating the start of evacuation is entered, the information may be transmitted to a destination(s) registered in advance with the disaster response application of the mobile terminal device 2 as well as to the safety confirmation device 4. By doing so, it is possible to inform the person(s) of the pre-registered destination(s) that the user has started to evacuate.

Figure 2:
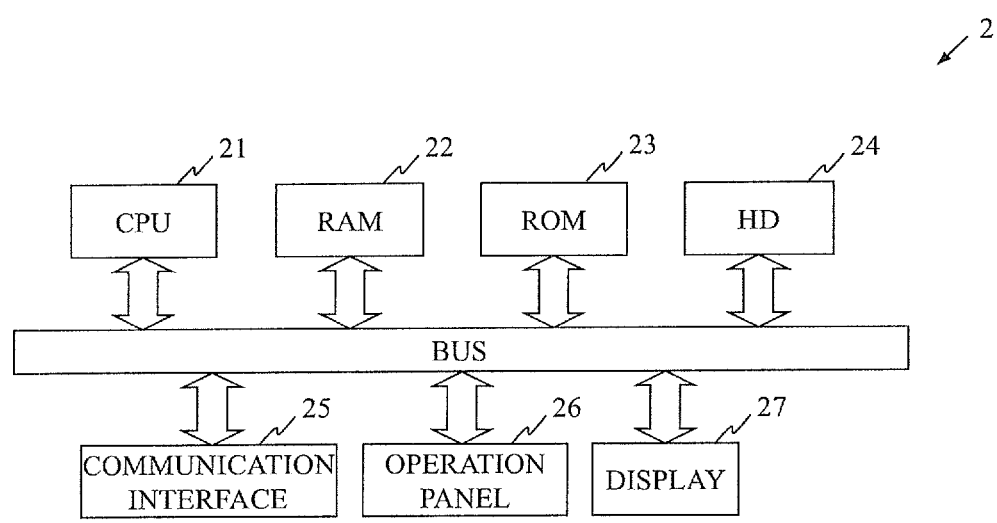
FIG. 2 is a hardware configuration diagram of the mobile terminal device according to the first embodiment.

FIG. 2 is a hardware configuration diagram of the mobile terminal device according to the embodiment. In FIG. 2, the mobile terminal device 2 is provided with a CPU 21, a RAM 22, a ROM 23, a hard disk (hereinafter referred to as HD) 24, a communication interface 25, an operation panel 26, and a display 27. The ROM 23 and the HD 24 store an operating system and various programs. Each program is read out in the RAM 22 as needed and executed by the CPU 21.

The communication interface 25 is an interface for communicating between devices. The operation panel 26 receives an entry from an input device such as a touch panel and a keyboard. The display 27 displays calculation results and the like. It is often the case that in recent smartphones which are popular as the mobile terminal device 2, the display 27 and the operation panel 25 are integrated together in terms of hardware. The above hardware configuration is merely one example and can be modified as needed.

Figure 3:
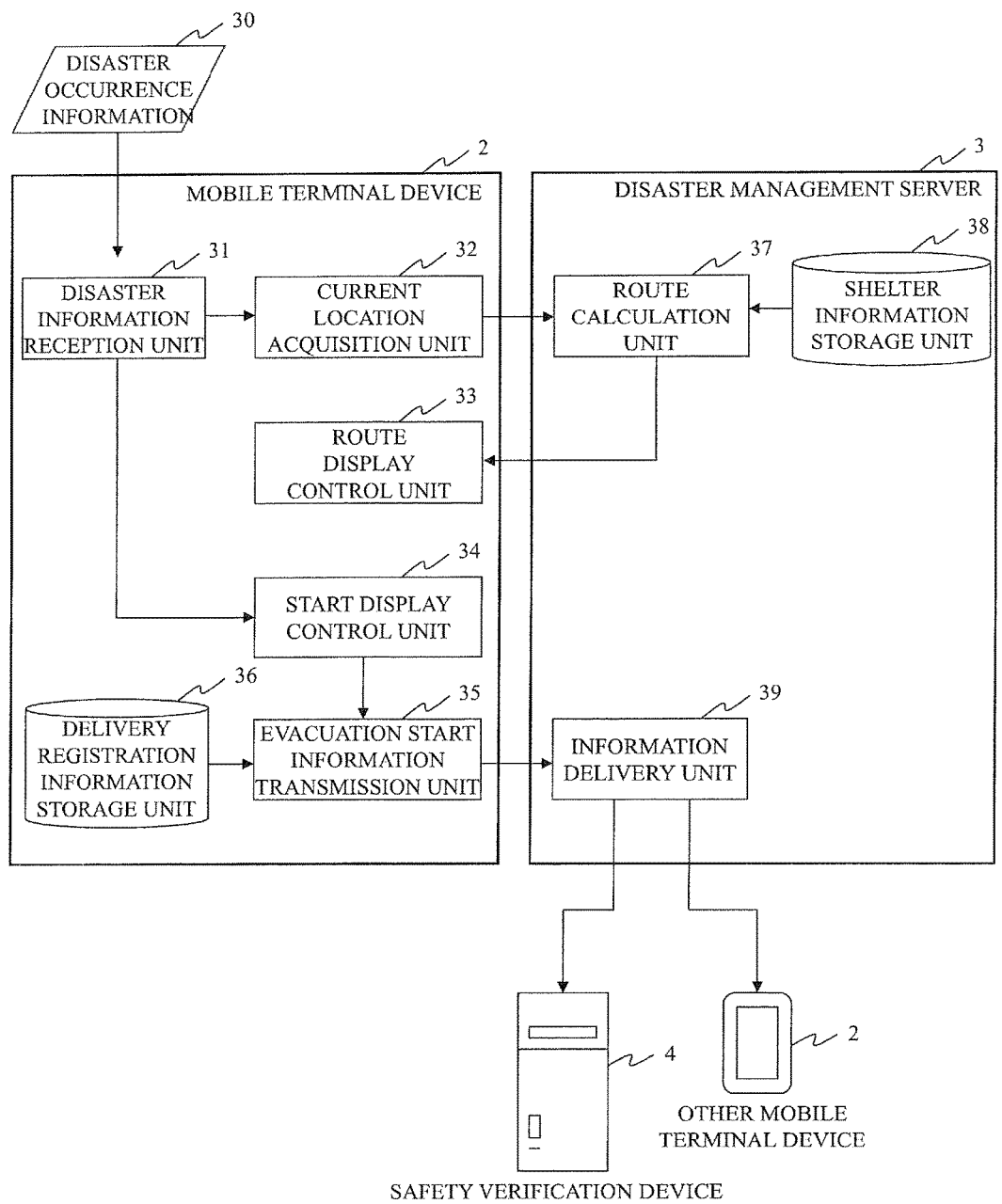
FIG. 3 is a functional block diagram showing a configuration of the mobile terminal device and a disaster management server according to the first embodiment.

FIG. 3 is a functional block diagram showing a configuration of the mobile terminal device and the disaster management server according to the present embodiment. The mobile terminal device 2 is provided with: a disaster information reception unit 31 that receives disaster occurrence information 30 such as, for example, an Earthquake Early Warning; a current location acquisition unit 32 that acquires a current location by GPS function; a route display control unit 33 that displaying the evacuation site and the evacuation route, calculated by the disaster management server 3, on the display 27; a start display control unit 34 that displays an entry screen for entering an input that evacuation has started, on the display 27, when the disaster information reception unit 31 has received the disaster occurrence information 30; and an evacuation start information transmission unit 35 that transmits delivery instruction information for delivering evacuation start information to a pre-registered destination(s) stored in a delivery registration information storage unit 36, to the disaster management server 3, when the information indicating the start of evacuation is entered.

Incidentally, at least the safety confirmation device 4 is registered in the delivery registration information storage unit 36 as the destination, and a destination(s) of a close person(s), for example, is registered therein as needed. Further, since it is necessary to send information for identifying a sender when sending the evacuation start information, information on the sender is also pre-registered. For example, with multiple pre-registration of information such as the sender's name, sex, date of birth, postal code, telephone number, and email address, it becomes possible to uniquely identify the sender.

The disaster management server 3 is provided with: a route calculation unit 37 that performs, from the location of the mobile terminal device 2, a selection of an optimal evacuation site and a calculation of a route to the evacuation site, based on the current location information transmitted from the mobile terminal device 2 and evacuation site information pre-registered in a shelter information storage unit 38; and an information delivery unit 39 that actually delivers the evacuation start information and the identification information of the sender to the designated destination(s) (such as the safety confirmation device 4 and other mobile terminal device(s) 2) when receiving information indicating a transmission of the evacuation start information from the mobile terminal device 2.

Incidentally, in the case where evacuation start information is transmitted from other mobile terminal device 2, it may be configured that information indicating that the user of the other mobile terminal device 2 has started evacuation is also displayed on the display 27 as needed. Further, with respect to the calculation of the route to the evacuation site, since optimal route calculation techniques are known, for example, in the car navigation system and the map information system, a detailed description will be omitted here.

Figure 4:
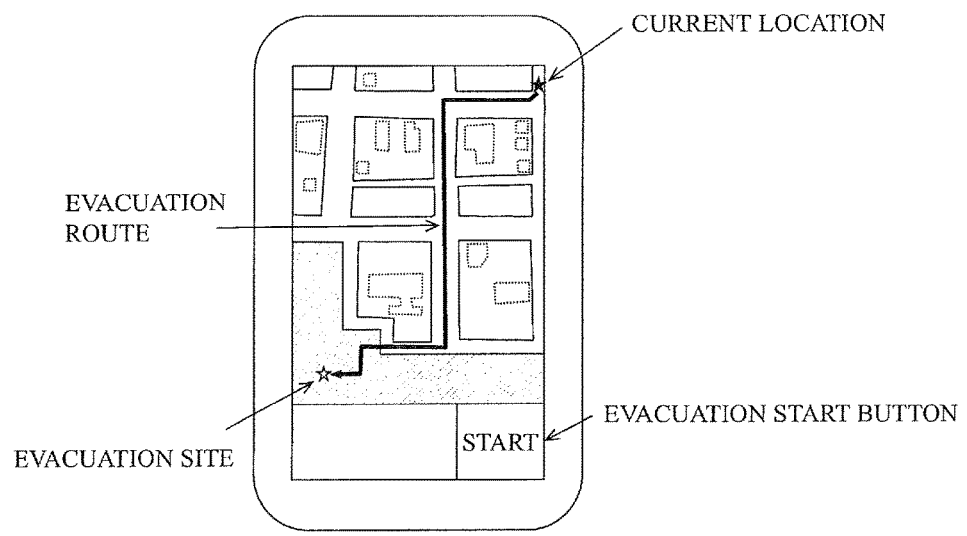
FIG. 4A is a view showing one example of a display screen of the mobile terminal device according to the first embodiment.
FIG. 4B is a view showing one example of a display screen of the mobile terminal device according to the first embodiment.
Figure 4:
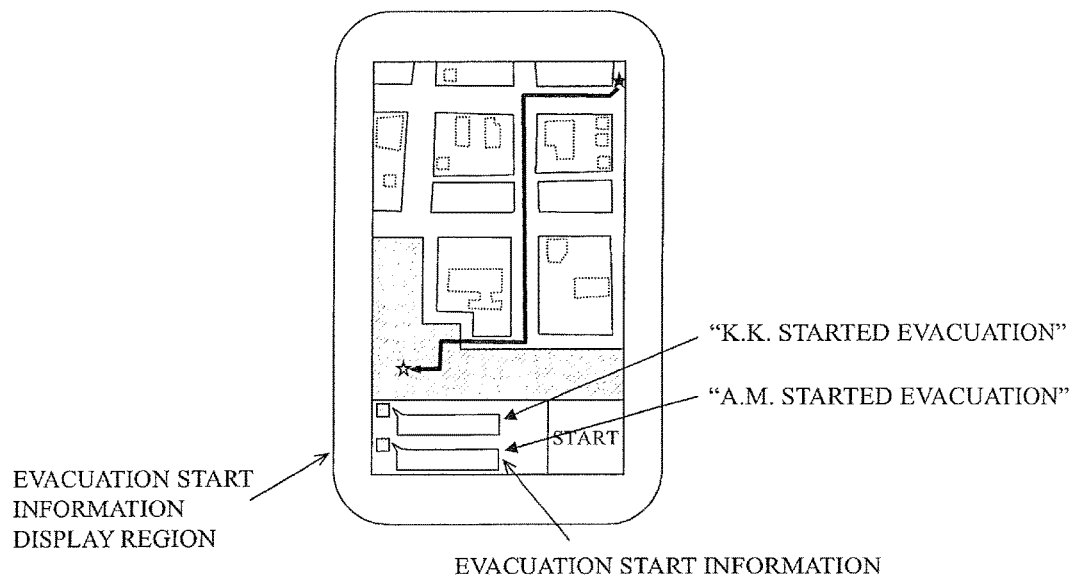

FIG. 4 is a view showing one example of a display screen of the mobile terminal device according to the present embodiment. FIG. 4A illustrates the display 27 when an entry screen for an evacuation route and an evacuation start is displayed. FIG. 4B illustrates the display 27 when receiving evacuation start information from other mobile terminal devices. FIG. 4A shows a marker indicating the current location and a marker indicating the evacuation site together with a map, and further shows the route from the current location to the evacuation site. An evacuation start button is displayed on the lower side of the display 27. A user presses this evacuation start button when starting evacuation. When the evacuation start button is pressed, the evacuation start information is transmitted to the safety confirmation device 4 and other mobile terminal device(s) 2 which are pre-registered.

When receiving the evacuation start information from other mobile terminal device(s) 2, information indicating that a user(s) of other mobile terminal device(s) 2 has started evacuation is displayed as needed, as shown in FIG. 4B. Thus, it is possible to inform other mobile terminal device(s) 2 about, by displaying, information indicating that the user 2 has started evacuation, and, therefore, it is possible to play a role as an initiative evacuee and to urge a user(s) of the other mobile terminal device(s) 2 to evacuate.

In the case that the evacuation start information is transmitted to the other mobile terminal device(s) 2, a situation of the evacuation start is displayed as needed, as shown in FIG. 4B. In the case that the evacuation start information is not transmitted to the other mobile terminal device(s) 2, the evacuation start information is transmitted only to the safety confirmation device 4 and is only managed as safety information.

Incidentally, it may be configured to transmit an evacuation situation (such as positional information of the mobile terminal device(s) when a disaster has occurred, information on an evacuation site calculated by the disaster management server 3) together with the evacuation start information. By doing so, it is possible to know (or inform) that evacuation has started as well as to know (or inform) from which location to which evacuation site to evacuate. In addition, it may be also configured to further display information such as information indicating that safety confirmation is carried out at the evacuation site (if you go to the evacuation site, you can carry out safety confirmation with certainty) and information indicating that evacuation is made a top priority, when performing the display of the display 27 as shown in FIG. 4. It is desirable that these displays are displayed in a conspicuous manner with minimum words (such as a blinking display, a different color display, a bigger display without interference with the display of the evacuation route.

Figure 5:
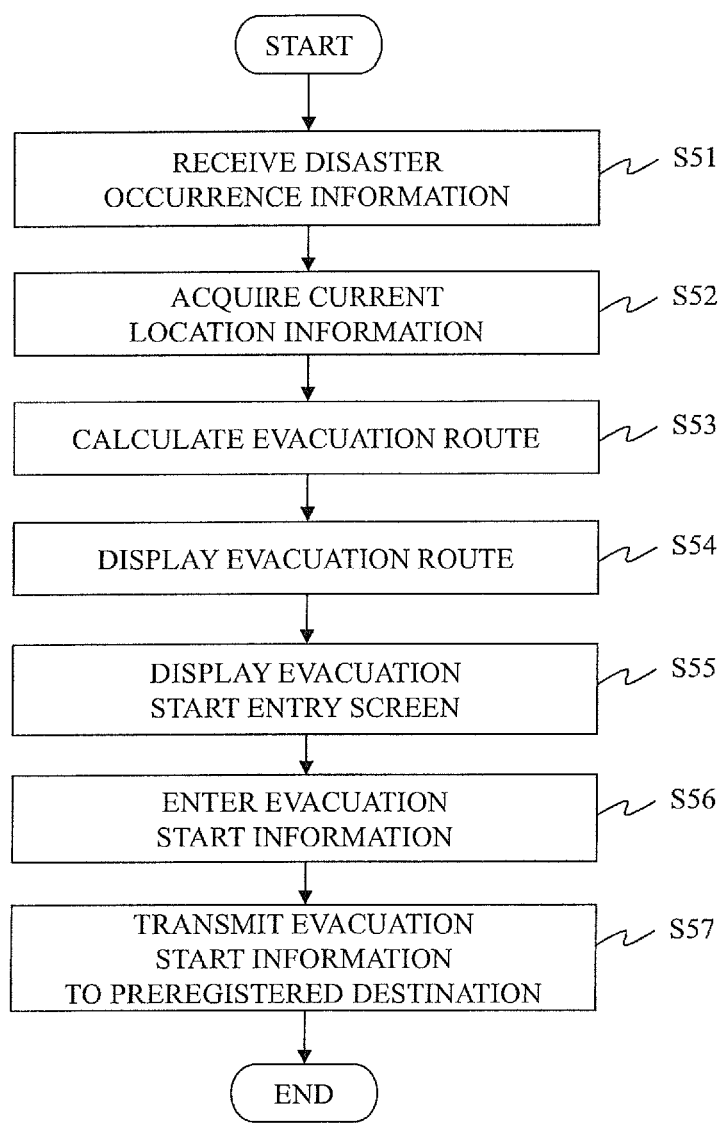
FIG. 5 is a flowchart showing the operation of the mobile terminal device and the disaster management server according to the first embodiment.

Next, the operation of the mobile terminal device and the disaster management server according to the present embodiment will be described. FIG. 5 is a flowchart showing the operation of the mobile terminal device and the disaster management server according to the present embodiment. At first, the disaster information reception unit 31 of the mobile terminal device 2 receives the disaster occurrence information 30 (S51). Triggered by the reception of the disaster occurrence information 30, the current location acquisition unit 32 acquires the current location information from the GPS (S52). The acquired current location information is transmitted to the disaster management server 3, and the route calculation unit 37 performs a selection of an evacuation site and a calculation of an optimal route to the evacuation site for the mobile terminal device 2, based on the received current location information and the information stored in the shelter information storage unit 38 (S53). Information on the calculated route is returned to the mobile terminal device 2, and the route display control unit 33 displays the evacuation route together with the map information on the display 27 (S54).

In parallel with the above-mentioned display processing of the evacuation route, and triggered by the reception of the disaster occurrence information 30, the start display control unit 34 displays the entry screen of the evacuation start (an evacuation start button) on the display 27 (S55). Then, the mobile terminal device 2 temporarily enters a standby state in which it waits for an entry from the user. When the user presses the evacuation start button, the evacuation start information is entered in the evacuation start information transmission unit 35 (S56), and the evacuation start information transmission unit 35 transmits, to the information delivery unit 39 of the disaster management server 3, a delivery instruction for delivering the evacuation start information together with the identification information of the sender, to a pre-registered destination(s) stored in the delivery registration information storage unit 36. The information delivery unit 39 delivers the evacuation start information indicating that evacuation has started, together with the identification information of the sender, to the received destination(s) (S57), and the processing ends.

Then, the safety confirmation device 4 that has received the identification information of the sender and the evacuation start information, registers the sender in the safety confirmation information with "evacuation started." Other mobile terminal device(s) 2 that has received the identification information of the sender and the evacuation start information, displays on the display 27 information indicating that the sender started to evacuate, in this case, the evacuation start information may be displayed as a pop-up, or the evacuation start information may be displayed by color coding when a screen of an address book is displayed, for example.

Thus, the mobile terminal device 2 according to the present invention acquires a current location when the disaster occurrence information has been received, displays a route that leads from the acquired current location to a pre-registered evacuation site, displays a start entry screen for entering an input that evacuation has started, and transmits, when evacuation start information indicating that the evacuation has started is entered from the start entry screen by an operation of a user, the evacuation start information to the pre-registered destination, so that it has an advantageous effect that it is possible to collect information indicating that the evacuation has started and utilize it as safety information and it is possible to urge the user to evacuate.

Second Embodiment of the Invention

A safety confirmation system according to this embodiment will be described with reference to FIG. 6 to FIG. 8. The safety confirmation system according to the embodiment is provided with a shelter terminal device 5 placed in the evacuation site, in addition to the configuration of the evacuation management system 1 as shown in FIG. 1 in the first embodiment. Incidentally, the description that overlaps with the first embodiment will be omitted in the present embodiment.

Figure 6:
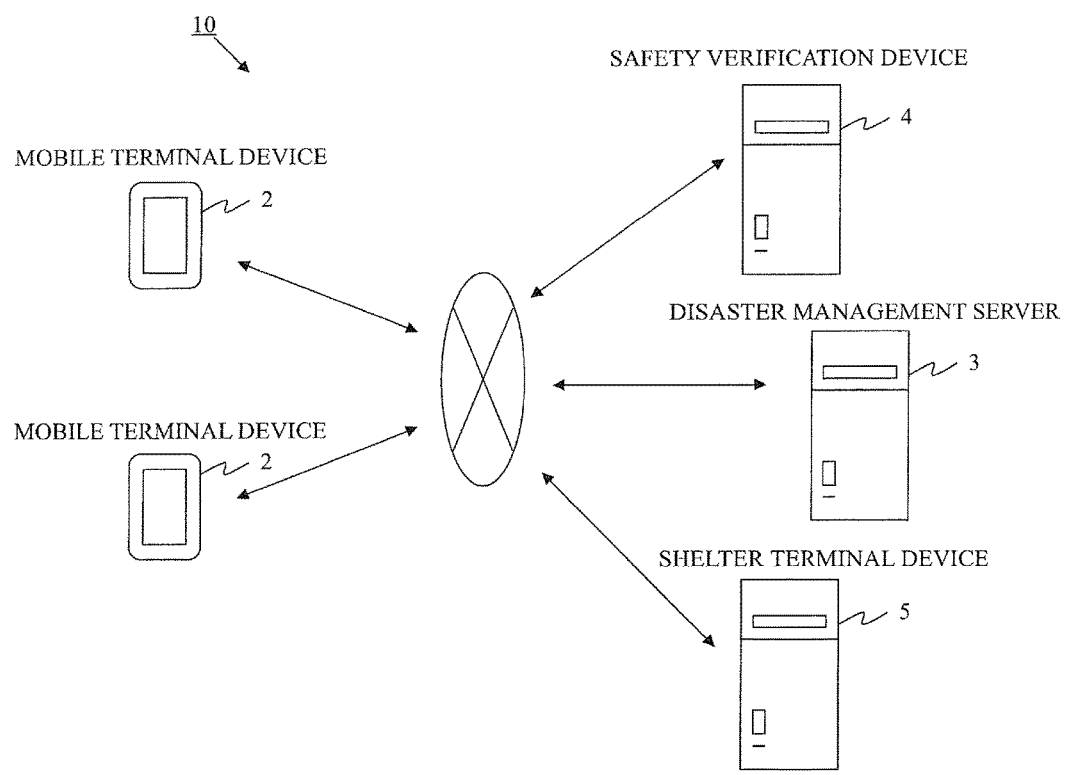
FIG. 6 is a system configuration diagram of a safety confirmation system according to the second embodiment.

FIG. 6 is a system configuration diagram of a safety confirmation system according to this embodiment. The safety confirmation system 10 is provided with the mobile terminal device(s) 2, the disaster management server 3, the safety confirmation device 4, and the shelter terminal device 5, and is configured such that these devices transmit and receive information through communications. As described in the first embodiment, after the evacuation start information is transmitted to the safety confirmation device 4, each user starts to evacuate toward the evacuation site displayed on the display 27. Then, when arriving at the evacuation site, each user registers information that evacuation has been completed, in the safety confirmation device 4 via the shelter terminal device 5, using the safety confirmation system 10 according to the embodiment. At the same time, it becomes possible to refer to safety confirmation information of a pre-registered person(s) from the safety confirmation device 4.

Figure 7:
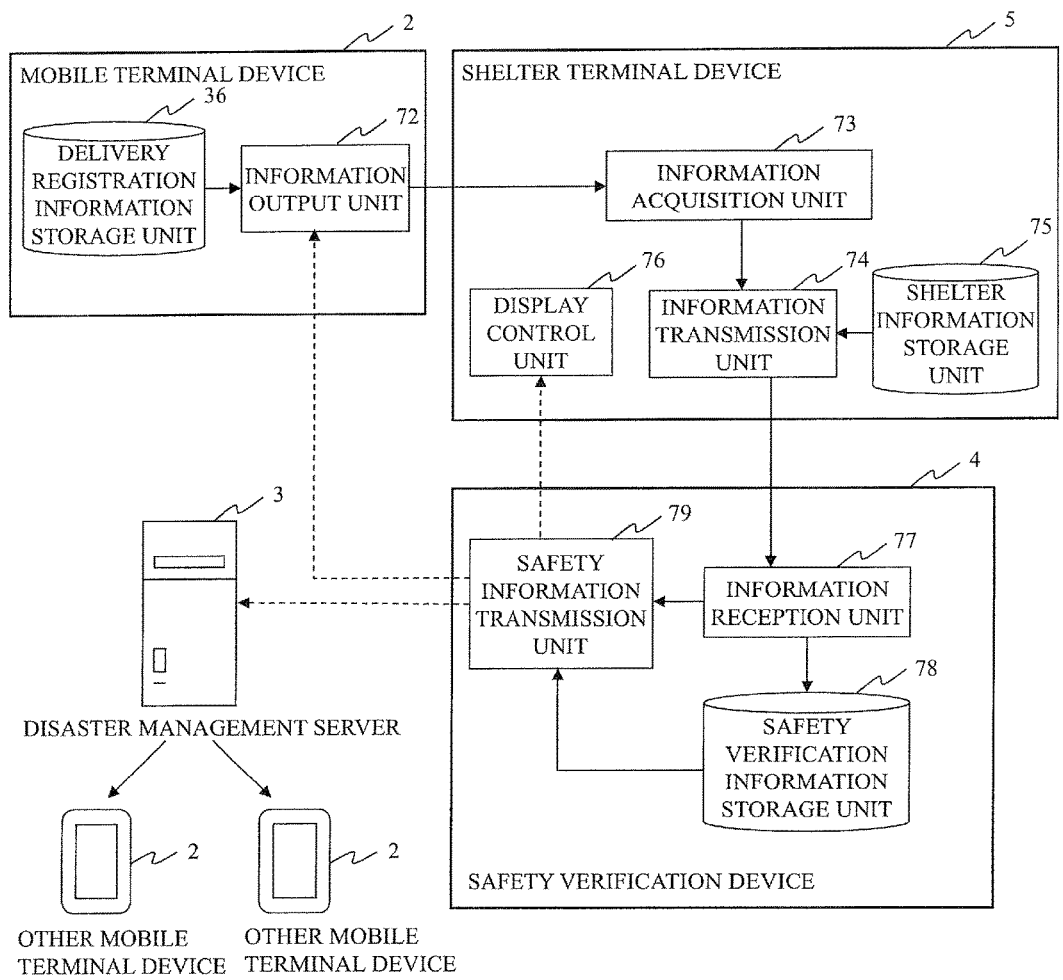
FIG. 7 is a functional block diagram of respective devices constituting the safety confirmation system according to the second embodiment.
Figure 8:
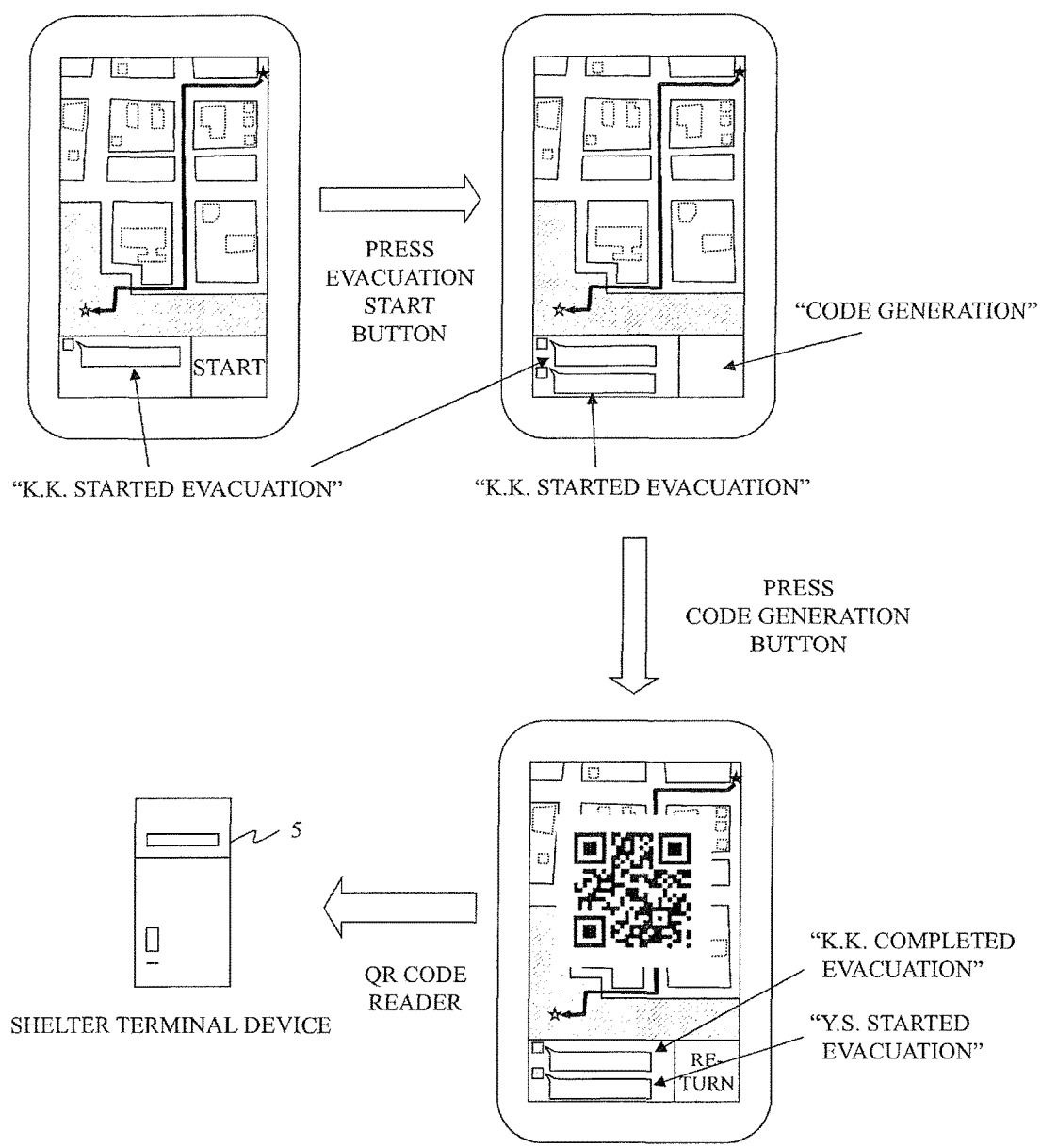
FIG. 8 is a diagram showing an information passing in the case of using a code in the safety confirmation system according to the second embodiment.

FIG. 7 is a functional block diagram of respective devices constituting the safety confirmation system according to this embodiment. Incidentally, it is described here as a block diagram only functions necessary for performing safety confirmation after arriving at the evacuation site. Although not shown in FIG. 7, in fact the elements of FIG. 3 in the first embodiment should be included in FIG. 7. The mobile terminal device 2 is provided with an information output unit 72 that outputs identification information of a user(s) stored in the delivery registration information storage unit 36 (information corresponding to the identification information of the sender in the first embodiment) and identification information of a pre-registered person(s) close to the user (hereinafter referred to as a safety confirmation target person(s)) (information corresponding to the destination(s) of the close person(s) in the first embodiment) to pass these items of information to the shelter terminal device 5.

Here, the processing when the information output unit 72 passes the information to the shelter terminal device 5 will be described. As a way of passing the information, it is possible to pass the information by such a way as communication using normal Internet connection, communication by infrared, short range wireless communication, and reading coded information. As one example, FIG. 8 shows an information passing in the case of using the QR Code™. For example, after the evacuation start button is pressed, this button is changed to a code generation button, and by the code generation button being pressed, the information output portion 72 of the mobile terminal device 2 generates the QR code based on the information stored in the delivery registration information storage unit 36 and displays the generated QR code on the display 27. The information acquisition unit 73 of the shelter terminal device 5 functions as a QR code reader so as to acquire necessary information by reading the QR code. By doing so, it becomes possible to pass necessary information with ease and certainty.

Referring back to FIG. 7, the shelter terminal device 5 is provided with: the information acquisition unit 73 that acquires information outputted from the information output unit 72 of the mobile terminal device 2; an information transmission unit 74 that transmits the acquired information with additional shelter information stored in a shelter information storage unit 75, to the safety confirmation device 4; and a display control unit 76 that displays the safety confirmation information transmitted from the safety confirmation device 4. The shelter terminal device 5 is placed in each evacuation site and can perform the processing in a state where the communication function and the power supply are secured sufficiently. A person(s) who arrived at the evacuation site passes the identification information of the user and the identification information of the safety confirmation target person stored in the mobile terminal device 2 to the shelter terminal device 5, and the shelter terminal device 5 transmits the information to the safety confirmation device 4. At this time, by adding information on the evacuation site, information on what evacuation site the user evacuated to can be registered as safety information.

The safety confirmation device 4 is provided with: an information reception unit 77 that receives information transmitted from the shelter terminal device 5; a safety confirmation information storage unit 78 that stores the user of the mobile terminal unit 2, of the received information, in a state of "evacuation completed" as the safety confirmation information; a safety information transmission unit 79 that extracts safety confirmation information by referring to the safety confirmation information storage unit 78 based on the identification information of the safety confirmation target person of the received information, and transmits the extracted information to the disaster management server 3, the shelter terminal device 5, and the mobile terminal device 2. That is, the safety confirmation device 4 performs the processing to register the information transmitted from the shelter terminal device 5 as the safety information, and to extract safety information on the safety confirmation target person and send it back.

A destination of the safety information may be any of the disaster management server 3, the shelter terminal device 5, and/or the mobile terminal device 2 as described above, and can be set arbitrarily. In the case that the safety information is sent to the disaster management server 3, as in the case of the first embodiment, the information delivery unit 39 can transmit, as needed, information on the user of the mobile terminal device 2 that has completed evacuation, to each registered mobile terminal device 2 (other mobile terminal device(s) 2) for notification. In the case that the safety information is sent to the mobile terminal device 2, the information output unit 72 can output an evacuation situation(s) (such as evacuation completed, evacuation started, and unknown) of the safety confirmation target person(s) pre-registered by the user to inform the user thereof. Similarly, also in the case that the safety information is sent to the shelter terminal device 5, the display control unit 76 can display the evacuation situation(s) of the safety confirmation target person(s) pre-registered by the user to inform the user thereof.

Figure 9:
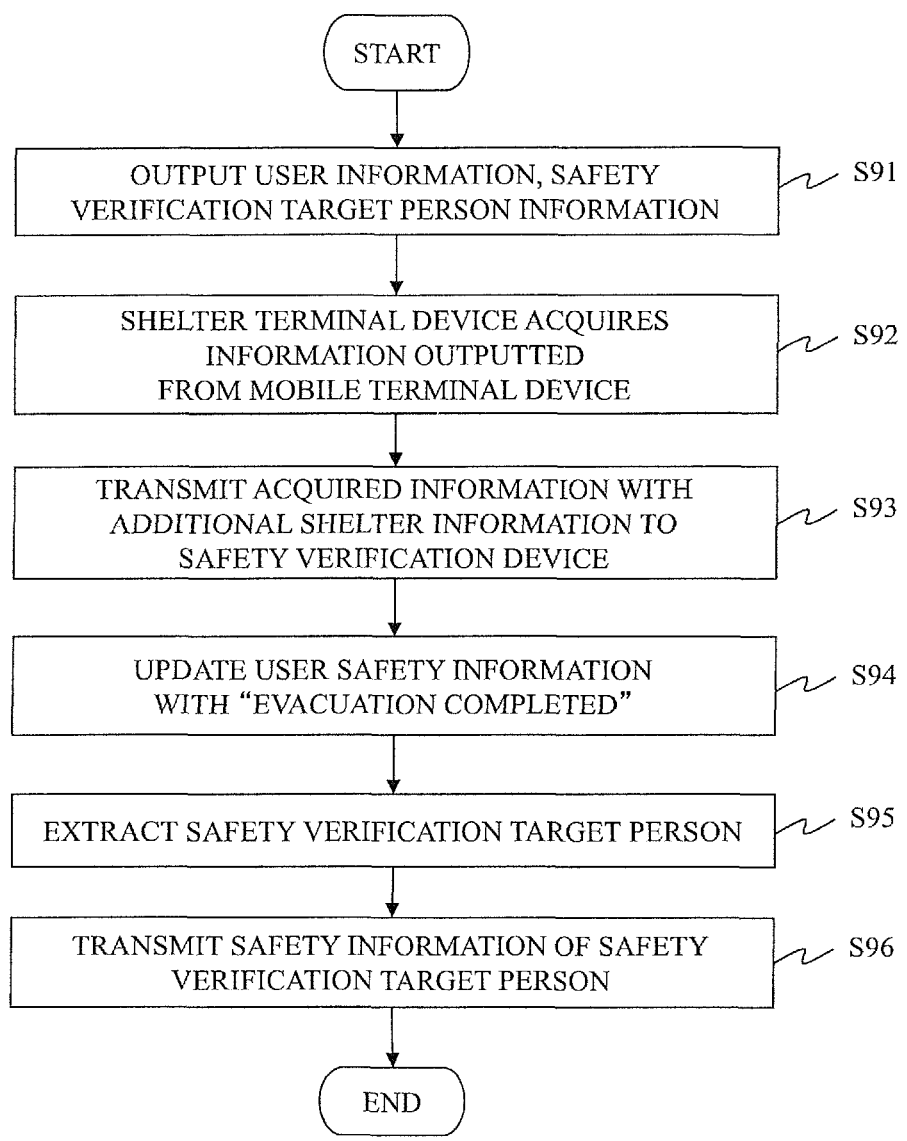
FIG. 9 is a flowchart showing the operation of the safety confirmation system according to the second embodiment.

Next, the operation of the safety confirmation system according to the present embodiment will be described. FIG. 9 is a flowchart showing the operation of the safety confirmation system according to the present embodiment. At first, the information output unit 72 of the mobile terminal device 2 outputs the identification information of the user and the identification information of the safety confirmation target person stored in the delivery registration information storage unit 36 (S91), and the information acquisition unit 73 of the shelter terminal device 5 acquires the information (S92). At this time, the information passing is performed by such a way as communication using normal Internet connection (in this case, the transmission of the information is allowed by entering information that the user can know only by arriving at the evacuation site (such as a password issued by the shelter terminal device 5)), communication by infrared, short range wireless communication, and reading coded information, as described above.

The Information transmission unit 74 transmits the information acquired from the mobile terminal apparatus 2 with additional information on the evacuation site stored in the shelter information storage unit 75, to the safety confirmation device 4 (S93). The information reception unit 77 of the safety confirmation device 4 receives the information transmitted from the shelter terminal device 5, and updates the user safety information stored in the safety confirmation information storage unit 78 from a state of "evacuation started" to a state of "evacuation completed" (S94). Incidentally, at this time, in the case that the "evacuation started" information is not present for the reasons such as forgetting pressing the evacuation start button, the safety information of "evacuation completed" is registered at this timing.

The safety information transmission unit 79 extracts, based on the identification information of the safety confirmation target person received by the information reception unit 77, the safety information of the safety confirmation target person from the safety confirmation information storage unit 78 (S95), and transmits the extracted safety information to the disaster management server 3, the shelter terminal device 5, and/or the mobile terminal device(s) 2 (S96), and the processing ends.

Thus, in the safety confirmation system 10 according to the present embodiment, when the user arrives at the shelter and passes his/her own identification information to the shelter terminal device 5 placed therein, this information is registered in the safety confirmation device 4 as a state that evacuation has been completed, and information on the safety state of the safety confirmation target person can be obtained together, so that it is possible to register user's own safety information and conduct confirmation of the safety of the safety confirmation target person(s). Further, it is possible to conduct confirmation of the safety of other person(s) by passing his/her own identification information to the shelter terminal device 5, so that it is possible to induce users to shelters fast.

Third Embodiment of the Invention

A safety confirmation system according to this embodiment is a functional extension of the safety confirmation system 10 in the second embodiment. When the mobile terminal device 2 receives the disaster occurrence information 30, the safety confirmation system according to the embodiment stores, in the mobile terminal device 2, a time from when the disaster occurred till when the evacuation was completed, imaging information that was captured since the disaster occurred till when the evacuation was completed, a route actually taken to evacuate, and/or voice information that was recorded since the disaster occurred till when the evacuation was completed, and passes these collected items of information to the shelter terminal device 5 when the evacuation was completed. Then, collected information that is thus collected is managed by the shelter terminal device 5 and/or the safety confirmation device 4, and is used to access and analyze the damage situation.

The time from when the disaster occurs till when the evacuation is completed, is determined as a time period from the point of time when the disaster occurrence information 30 is received till the point of time when the user identification information is passed to the shelter terminal device 5. The imaging information that is captured since the disaster occurs till when the evacuation is completed, is imaging information obtained by such an operation that at the point of time when the disaster occurrence information 30 is received, the disaster response application starts up a camera for capturing a moving image or a still image included in the mobile terminal apparatus 2, and the camera automatically takes an image on a periodic basis until the point of time when the identification information is passed to the shelter terminal device 5. Although there is a possibility that the mobile terminal apparatus 2 is put in a bag or a pocket during evacuation and no image can be taken, it is possible to collect valuable images during evacuation if it happens to be in a state that a lens of the camera can take an image around the user.

The route actually taken to evacuate can be obtained by collecting positional information of the GPS acquired periodically from the point of time when the disaster occurrence information 30 is received till the point of time when the identification information is passed to the shelter terminal device 5, through which it is possible to know the migration pathway of the user after the disaster occurred. The voice information that is recorded since the disaster occurs till when the evacuation is completed, is information on a voice collected by a microphone of the mobile terminal device 2 from the point of time when the disaster occurrence information 30 is received till the point of time when the identification information is passed to the shelter terminal device 5. By recording a voice of the user and/or a voice of other evacuee(s), the voice information can be used to access and analyze the damage situation.

When the user arrives at the evacuation site and passes information to the shelter terminal device 5, each item of information collected as mentioned above is also collected. These items of information are not only used to access and analyze the damage situation but also used as a material for determining the valuation of insurance at the time of reconstruction, and further becomes available for future research materials.

In particular, with respect to the valuation of insurance, insurance companies need to determine the valuation of insurance very carefully and can take advantage of the assessment by the collection of any information at all during evacuation. For example, if such an agreement is made in a disaster insurance rider that there is a refund on condition that evacuation shall be started immediately after receiving the disaster occurrence information 30, it is possible to urge evacuation first when a disaster occurs and suppress expansion of damage. In such a case, information such as the time required for the evacuation and the migration route will be an important evidence.

Further, if there is such a service, in a disaster insurance rider, that an insurance premium is discounted for an initiative evacuee, it is possible to effectively utilize the initiative evacuee and suppress expansion of damage. In such a case, by checking whether or not the evacuation start information is delivered to a close person(s) of the user, or by checking, with the collected voice information, whether or not a voice such as "Everyone, get away!" is recorded immediately after a disaster occurs, as described in the above embodiments, the checking result can be used as an evidence.

Thus, by collecting information immediately after a disaster occurs till evacuation is completed as much as possible, the collected information can be not only used to access and analyze the damage situation but also used for payment and research of insurance later.

Incidentally, each embodiment as mentioned above has been described on the assumption that it is in a state that call and communication function during evacuation are secured. In the case that it is unavoidably difficult to secure communication function due to congestion of the line or physical disconnection, the function used by the disaster response application may be restricted. For example, it may be controlled to such a restriction state that only the reception of the GPS and the transmission of the evacuation start information can be performed and other functions using the line cannot be used.

Moreover, in the case that evacuation is likely to be performed in groups as schools, special nursing homes, and hospitals, a leader of each group may represent each individual by processing the evacuation start information and the completion of evacuation on behalf of the group.

Further, the information stored in the safety confirmation information storage unit 78 of the safety confirmation device 4 may be provided as public information to be accessible to the public. By doing so, people from a distance can check safety without making a call directly and lines to be used can be suppressed.

Furthermore, for example, a person who does not possess the mobile terminal device 2 and a person who ran out of the house in a hurry and left the mobile terminal device 2 may register safety information from the shelter terminal device 5 at the time when the person arrived at the evacuation site. Further, even with the mobile terminal device 2 of another person, the evacuation start information may be transmitted by entering the identification information of the own (the person who left the mobile terminal device 2 or the person who does not possess the mobile terminal device 2).

Fourth Embodiment of the Invention

A mobile terminal device and a call-to-action system according to this embodiment will be described with reference to FIG. 10 to FIG. 12. In the call-to-action system according to the embodiment, the mobile terminal device delivers, when receiving information that triggers calling forth a predetermined action and when starting the predetermined action, information indicating the start of the predetermined action, to pre-registered destination(s). Further, an initiative actor is identified by analyzing information on a migration state of the mobile terminal device after receiving the information that triggers calling forth the predetermined action.

Incidentally, the predetermined action includes, for example, blood donation (based on delivery information about the shortage of transfusion blood), evacuation drill (based on guidance information about the start of evacuation drill), vote for the election (based on guidance information on the election day), training (based on guidance information on the training day), non-smoking (based on guidance information about non-smoking month), diet (based on guidance information about health month), commuting using public transportation (based on guidance information about car-free day), volunteer (based on delivery information about people in need), and evacuation as described in each embodiment mentioned above (based on the disaster occurrence information), and is directed to such an action that is carried out based on information for calling forth the action, which is shown in parentheses. In particular, the present invention can be made use of in a social contribution by utilizing the present invention for such an act as socially recommended. Further, it is possible, by analyzing daily activities as mentioned above and previously identifying a person to be an initiative actor, to get the person to act as an initiative evacuee when an extraordinary event such as a disaster occurs, and to make use of the present invention in saving many lives.

Figure 10:
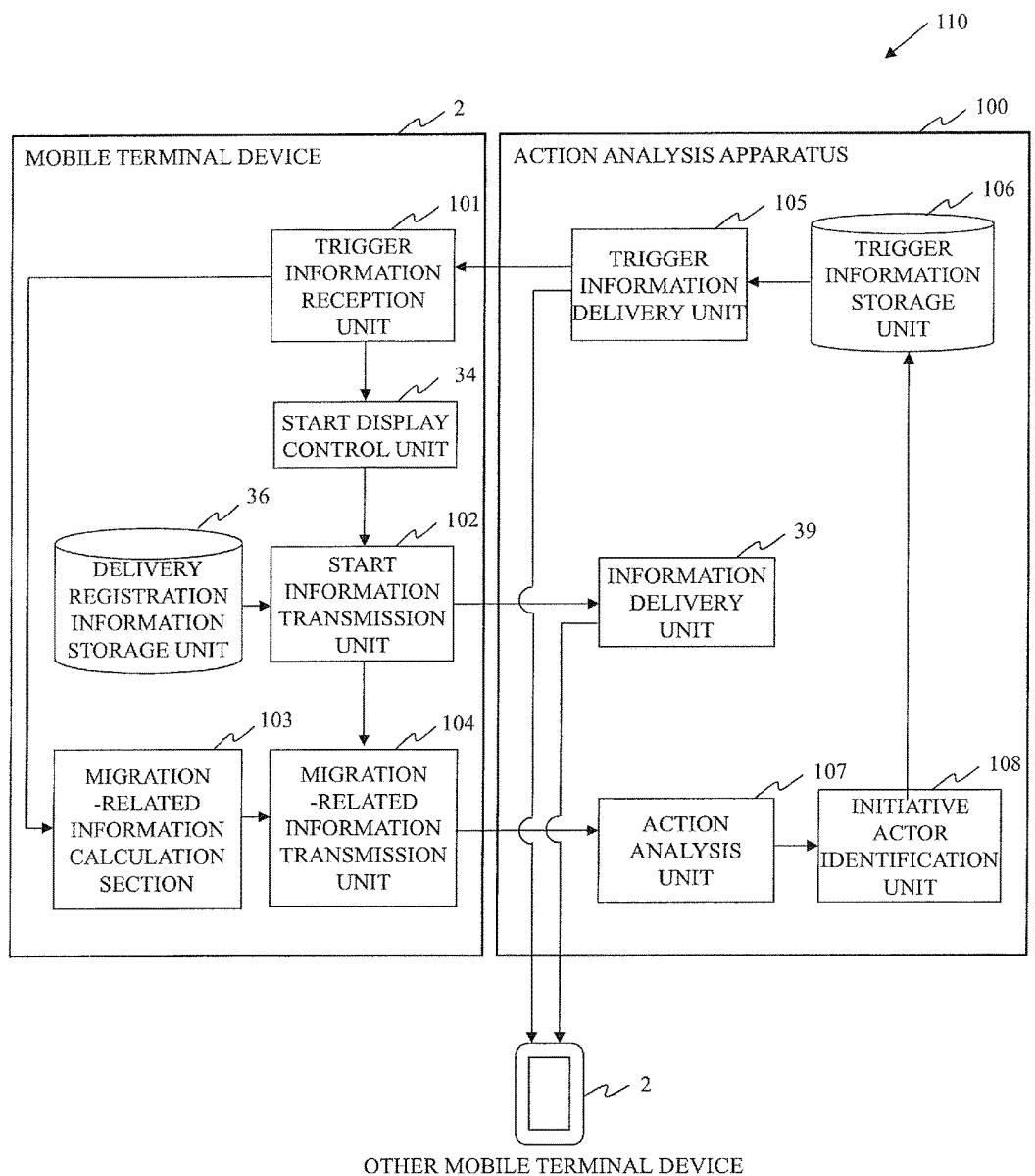
FIG. 10 is a functional block diagram of a call-to-action system according to the fourth embodiment.

FIG. 10 is a functional block diagram of the call-to-action system according to the present embodiment. A call-to-action system 110 is provided with the mobile terminal device 2 and an action analysis device 100. The mobile terminal device 2 is provided with: a trigger information reception unit 101 that receives trigger information, delivered from the action analysis device 100, that triggers calling forth an action as exemplified above, for example; a start display control unit 34 that displays the received trigger information as well as a comment entry field and an entry screen for entering an input that the action has started, on the display 27; an evacuation start information transmission unit 35 that transmits delivery instruction information for delivering action start information to a pre-registered destination(s) stored in a delivery registration information storage unit 36, to the action analysis device 100, when the information indicating the start of action is entered; a migration related information calculation unit 103 that calculates the operation and the migration of the mobile terminal device 2 after having received the trigger information to generate migration related information; and a migration related information transmission unit 104 that transmits the generated migration related information to the action analysis device 100.

The action analysis device 100 is provided with: a trigger information storage unit 106 that stores trigger information that triggers calling forth a pre-registered predetermined action; a trigger information delivery unit 105 that delivers the trigger information to a pre-registered delivery target person(s) on a day and at a time that are predetermined; an information delivery unit 39 that delivers the action start information and the identification information of the sender to a designated destination(s) (other mobile terminal device 2) when receiving the delivery instruction information indicating transmission of the action start information from the mobile terminal device 2; an action analysis unit 107 that analyzes the action of the mobile terminal device 2 based on the migration related information transmitted from the mobile terminal device 2; and an initiative actor identification unit 108 that identifies an initiative actor(s) based on the analyzed action information and stores the identified initiative actor(s) in the trigger information storage unit 106. In case that a disaster or the like occurs and that the disaster occurrence information is to be delivered as trigger information of evacuation action, information indicating that an initiative action is to be taken is also delivered to the mobile terminal device 2 of the identified initiative actor.

Figure 11A:
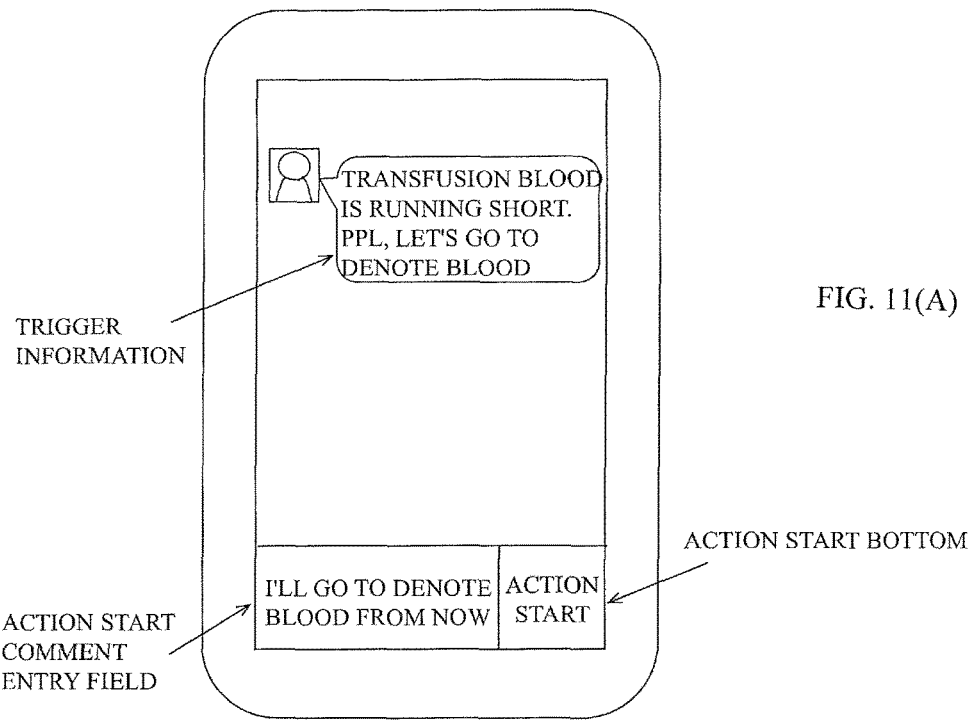
FIG. 11A is a view showing an example of a display screen of a mobile terminal device according to the fourth embodiment.
Figure 11B:
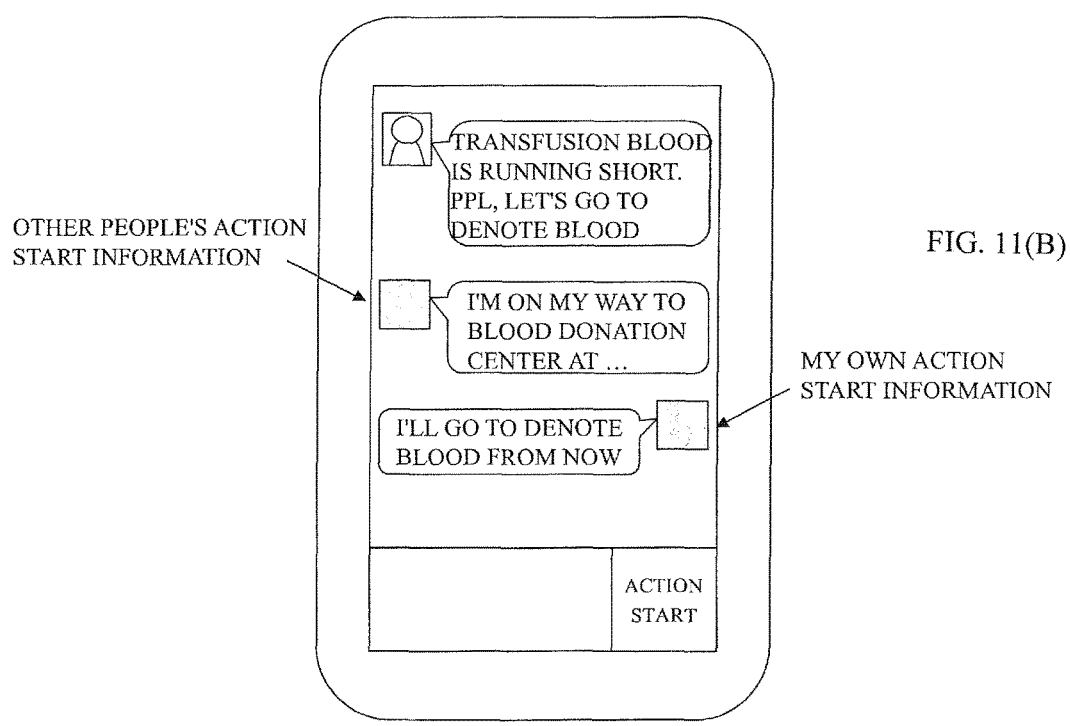
FIG. 11B is a view showing an example of a display screen of a mobile terminal device according to the fourth embodiment.
Figure 12:
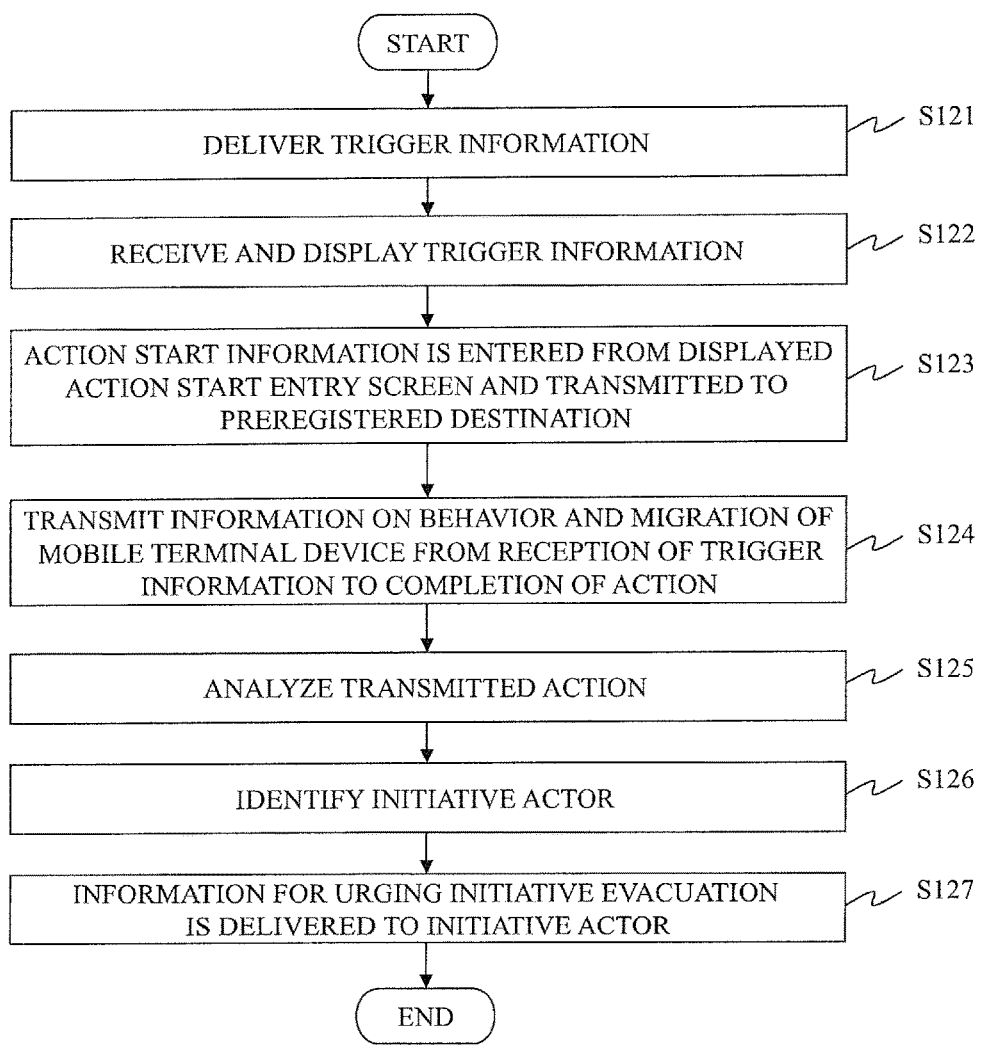
FIG. 12 is a flowchart showing the operation of the call-to-action system according to the fourth embodiment.

FIG. 11 is a view showing an example of a display screen of the mobile terminal device according to the present embodiment. FIG. 11A shows the display 27 when trigger information and an entry screen for action start are displayed. FIG. 11B shows the display 27 when action start information was transmitted from his/her own mobile terminal device and when action start information was received from other mobile terminal devices. In FIG. 11A, trigger information, delivered from the action analysis device 100, indicating that transfusion blood is running short is displayed. An action start button is displayed on the lower side of the display 27. A user presses this action start button when starting action (in this case, action of going to donate blood). In this case, it is possible to enter a comment freely when starting action. This action start comment entry function is not necessarily required. When the action start button is pressed, the action start information is transmitted to a pre-registered destination(s).

When having received action start information from other mobile terminal device(s) 2, information indicating that a user(s) of other mobile terminal device(s) 2 has started action is displayed as needed, as shown in FIG. 11B. Similarly, when the user has pressed the action start button, the user's own action is displayed on the screen. Thus, by notifying, by displaying on other mobile terminal device(s) 2, the information indicating that the user has started action, it is possible to call forth an action of a user of other mobile terminal device 2.

Incidentally, when the action is completed, an action complete terminal capable of obtaining information from the mobile terminal device 2 like the shelter terminal device 5 in the second embodiment, is placed in advance in a destination (in this case, blood donation room and blood donation bus), and by obtaining information with such a way as communication using normal Internet connection from the mobile terminal device 2, communication by infrared, short range wireless communication, and information passing through reading coded information, the mobile terminal device may be set action completed. Information that action is completed is transmitted from the mobile terminal device 2 whose action is completed or the action complete terminal to the action analysis device 100 and is used for calculation of action analysis.

In addition, action may be set completed by allowing the user of the mobile terminal device 2 to enter information that action is completed. That is, the action start button is changed to an action complete button by being pressed when action starts, and the mobile terminal device 2 may be set action completed by pressing the action complete button.

Information on the operation and the migration of the mobile terminal device 2 from when the trigger information is delivered till when action is completed, is collected at the migration related information calculation unit 103, and is transmitted to the action analysis device 100 by the migration related information transmission unit 104. The action analysis device 100 performs analysis processing of the action of the mobile terminal device 2 based on the transmitted migration related information and identifies the initiative actor(s). These action analysis processing and initiative actor identification processing will be described specifically.

Specific examples of the action analysis processing includes determining, by calculation: measurement of a time from when the trigger information is received till when the action start button is pressed; measurement of a time from when the action start button is pressed till when the action is completed; a migration pathway during the action; a migration speed during the action; the number of times the same action is performed; the number of reply comments from other mobile terminal device(s) 2; and the number of times the action start information is delivered to other mobile terminal device(s) 2 and thereafter the delivered other mobile terminal device(s) 2 has started actions within a predetermined time, for example.

The initiative actor identification processing is performed based on a result of the above-mentioned action analysis. For example, if the time from when the trigger information is received till when the action start button is pressed is shorter, it can be estimated that the user has the characteristics as an initiative actor who takes action early. Although depending on the content of the action, when such an action as an evacuation drill is called forth, if the time from when the action start button is pressed till when the action is completed is shorter, it can be estimated that the user has the characteristics as an initiative actor who takes initiative and evacuate. With respect to the migration pathway and the migration speed, if a user migrates the shortest distance quickly, it can be estimated that the user has the characteristics as an initiative actor. In the same manner, if the number of times the same action is performed, the number of reply comments from other mobile terminal device(s) 2, or the number of times the action start information is delivered to other mobile terminal device(s) 2 and thereafter the delivered other mobile terminal device(s) 2 has started actions within a predetermined, is determined to be larger, it can be estimated that the user has the characteristics as an initiative actor.

Incidentally, with respect to the initiative actor identification, the characteristics as an initiative actor may be determined for each item as described above, or may be comprehensively determined considering all of the above items together. In this case, the initiative actor identification may be performed by adding up a characteristic value as an initiative actor when a predetermined condition is met for each item and by determining a user who has the mobile terminal device 2 whose final characteristic value exceeds a predetermined threshold value to the initiative actor.

Further, it may be possible to weight characteristic values of the initiative actor for each item and vary a score to be added depending on the items. For example, a score to be added of the characteristic value when the number of times the action start information is delivered to other mobile terminal device(s) 2 and thereafter the delivered other mobile terminal device(s) 2 has started actions within a predetermined is large, is set to be larger, and a score to be added of the characteristic value when the number of reply comments from other mobile terminal device(s) 2 is large, is set to be smaller. That is, in the former case, the initiative action is considered to have a significant influence on urging other people to act, while in the latter case, the initiative action is not considered to have an influence very much on urging other people to act. Therefore, the score to be added of the characteristic value in the case of the former case is set to be larger compared to the latter case.

The initiative actor information thus identified is stored in the trigger information storage unit 106. In case that a disaster or the like occurs and it is necessary to deliver trigger information for calling forth evacuation, information for urging initiative evacuation is delivered to an initiative actor(s) in conjunction with the trigger information. Since the initiative actor is a person whose characteristics thereof are believed to be high, it is possible to save many lives by his/her taking initiative and starting evacuation action.

Next, the operation of the call-to-action system according to the present embodiment will be described. FIG. 12 is a flowchart showing the operation of the call-to-action system according to the present embodiment. At first, the trigger information delivery unit 105 of the action analysis device 100 delivers trigger information that triggers calling forth an action, simultaneously to a plurality of mobile terminal devices 2 that are pre-registered (S121). The trigger information reception unit 101 of each mobile terminal device 2 receives the trigger information, and the start display control unit 34 displays a screen for entering an input that action has started (S122). Information indicating that action has started is entered by a user, start information transmission unit 102 transmits a delivery instruction information, along with a pre-registered destination(s), to the action analysis device 100, and the information delivery unit 39 of the action analysis device 100 delivers action start information to each destination (S123). At the same time as the trigger information reception unit 101 receives the trigger information, the migration related information calculation unit 103 aggregates migration related information on the operation and the migration of the mobile terminal device 2, and the migration related information transmission unit 104 transmits aggregate results to the action analysis device 100 (S124). The action analysis unit 107 analyzes actions based on the aggregate results of the migration related information transmitted from the mobile terminal device 2 (S125), and the initiative actor identification unit 108 identifies an initiative actor(s) based on the analysis results (S126). Information on the identified initiative actor(s) (information on the mobile terminal device 2 possessed by the initiative actor(s)) is stored in the trigger information storage unit 106. When a disaster occurs, along with the delivery of the disaster occurrence information, information for urging an initiative action (such as information indicating that you are invited to start an initiative action) is also delivered but only to the mobile terminal device 2 of the initiative actor (S127).

Incidentally, the mobile terminal device 2 of the user identified as the initiative actor may be informed of having high characteristics as the initiative actor not only at the time when a disaster occurs but also on a daily basis. By doing so, it is possible to start an initiative action smoothly at a time of emergency.

In the present embodiment, the migration related information calculation unit 103, the migration related information transmission unit 104, the action analysis unit 107, and the initiative actor identification unit 108 are not necessarily required. That is, it is possible to urge other people to conduct such an action as serves for a social contribution, even provided with only a function of delivering information indicating an action has started to other mobile terminal device(s) 2 based on delivered trigger information.

Thus, by utilizing the call-to-action system according to the present embodiment, it is possible to urge such an initiative action as serves for a social contribution at normal times, and, by analyzing its utilization at normal times and previously identifying an initiative actor(s), it is also possible to urge the initiative actor(s) toward initiative evacuation at a time of emergency when a disaster or the like occurs and to minimize the damage caused by the disaster.

REFERENCE SIGNS LIST

1 evacuation management system
2 mobile terminal device
3 disaster management server
4 safety confirmation device
5 shelter terminal device
10 safety confirmation system
21 CPU
22 RAM
23 ROM
24 HD
25 communication interface
26 operation panel
27 display
30 disaster occurrence information
31 disaster information reception unit
32 current location acquisition unit
33 route display control unit
34 start display control unit
35 evacuation start information transmission unit
36 delivery registration information storage unit
37 route calculation unit
38 shelter information storage unit
39 information delivery unit
72 information output unit
73 information acquisition unit
74 information transmission unit
75 shelter information storage unit
76 display control unit
77 information reception unit
78 safety confirmation information storage unit
79 safety information transmission unit
100 action analysis device
101 trigger information reception unit
102 start information transmission unit
103 migration related information calculation unit
104 migration related information transmission unit
105 trigger information delivery unit
106 trigger information storage unit
107 action analysis unit
108 initiative actor identification unit
110 call-to-action system

What is claimed is:
1. A call-to-action system comprising:
a mobile terminal device; and
an action analysis device configured to receive information on an evacuation action to be performed by the user of the mobile terminal device and manages and aggregates the received information, wherein the mobile terminal device comprises:
- a trigger information reception unit configured to receive trigger information that triggers calling forth the evacuation action;
- a start display control unit configured to display a start entry screen for entering an input that the evacuation action has started;
- an action start information transmission unit configured to transmit, when action start information indicating that the evacuation action has started is entered from the start entry screen by an operation of a user, the action start information to a pre-registered destination;
- a display configured to receive the action start information transmitted from another mobile terminal device in which a destination of the mobile terminal device is pre-registered, and configured to display information indicating that a user of the other mobile terminal device has started the evacuation action; and
- a migration information transmission unit configured to transmit migration information on a migration state of the mobile terminal device to the action analysis device, and the action analysis device comprises:
- an action analysis unit configured to analyze at least a time from when the action analysis device receives the trigger information till when the action analysis device starts to migrate, included in the migration information transmitted from the mobile terminal device; and
- an initiative actor identification unit configured to identify the mobile terminal device of an initiative actor based on the analyzed action;

wherein the evacuation action is induced by transmitting and receiving action start information between users of the mobile terminal devices who are calling forth a same evacuation action;

the mobile terminal device further comprises:
- a current location acquisition unit configured to acquire a current location when the disaster occurrence information has been received; and
- a route display control unit configured to display a route that leads from the acquired current location to a pre-registered evacuation site.

2. The call to action system mobile terminal device according to claim 1, wherein:
the trigger information is disaster occurrence information that is delivered when a disaster has occurred;
the start display control unit configured to display a start entry screen for entering an input that evacuation has started; and
the action start information transmission unit configured to transmit, when evacuation start information indicating that the evacuation has started is entered from the start entry screen, the evacuation start information to the destination.

3. The call to action system according to claim 2, wherein the evacuation start information is transmitted to a safety confirmation device that aggregates pre-registered safety confirmation information.

4. The call to action system according to claim 2, wherein the evacuation start information is transmitted simultaneously to a part or all of destinations registered in the mobile terminal device.

5. The call to action system according to claim 4, wherein when the evacuation start information has been received from another mobile terminal device that is pre-registered, an evacuation situation of the other mobile terminal device is displayed.

6. The call to action system according to claim 1, further comprising:
a shelter terminal device placed in the evacuation site; and
a safety confirmation device configured to aggregate safety confirmation information, wherein
the mobile terminal device further comprises:
- an output unit configured to output information for identifying the user and information for identifying a safety confirmation target person of the user, both items of information being pre-registered, the shelter terminal device comprises:
- an acquisition unit configured to acquire the information for identifying the user and the information for identifying the safety confirmation target person of the user, both items of information being outputted from the mobile terminal device; and
- a transmission unit configured to transmit the acquired information with additional information on a shelter in which the shelter terminal device is placed, to the safety confirmation device, and the safety confirmation device comprises:
- a storage unit configured to store information for identifying the user and information for indicating a safety state of the user;
- a registration unit configured to register, when receiving the information for identifying the user, the safety state of the user in the storage unit as a state in which evacuation has been completed; and
- a transmission unit configured to extract, when receiving the information for identifying the safety confirmation target person, information for indicating a safety state of the safety confirmation target person from the storage unit based on the received information, and for transmitting the extracted information to the shelter terminal device and/or the mobile terminal device.

7. The call to action system according to claim 6, wherein:
the output unit of the mobile terminal device is configured to encode the information for identifying the user and the information for identifying the safety confirmation target person of the user and displays a resulting code on a screen; and
the acquisition unit of the shelter terminal device is configured to acquire the information for identifying the user and the information for identifying the safety confirmation target person of the user by reading the code displayed on the mobile terminal device.

8. The call to action system according to claim 6, wherein:
the output unit of the mobile terminal device is configured to output a time from when the mobile terminal device receives the disaster occurrence information till when the acquisition unit of the shelter terminal device acquires the information, imaging information that the mobile terminal device has captured since receiving the disaster occurrence information, a migration pathway of the mobile terminal device since receiving the disaster occurrence information, and/or voice information that the mobile terminal device has recorded since receiving the disaster occurrence information; and
the acquisition unit of the shelter terminal device is configured to acquire each item of information outputted by the output unit along with the information for identifying the user and the information for identifying the safety confirmation target person of the user.

9. The call-to-action system according to claim 1, wherein the action analysis unit is configured to analyze a number of cases where mobile terminal devices, destinations to which action start information indicating that the predetermined evacuation action has started is delivered, have started the evacuation action based on the trigger information.

10. The call-to-action system according to claim 1, wherein the trigger information is disaster occurrence information that is delivered when a disaster has occurred, and further comprising an initiative evacuation information transmission unit configured to transmit, when the trigger information has been received, information for urging initiative evacuation to the mobile terminal device of the initiative actor identified by the initiative actor identification unit.

11. A call-to-action method comprising:
a trigger information reception step, performed by a mobile terminal device, of receiving trigger information that triggers calling forth an evacuation action;
a start display control step, performed by the mobile terminal device, of displaying a start entry screen for entering an input that the evacuation action has started;
an action start information transmission step, performed by the mobile terminal device, of transmitting, when action start information indicating that the evacuation action has started is entered from the start entry screen by an operation of a user, the action start information to a pre-registered destination;
a display step, performed by the mobile terminal device, of receiving the action start information transmitted from another mobile terminal device in which a destination of the mobile terminal device is pre-registered, and displaying information indicating that a user of the other mobile terminal device has started the evacuation action;
a migration information transmission step, performed by the mobile terminal device, of transmitting migration information on a migration state of the mobile terminal device to the action analysis device;
an action analysis step, performed by an action analysis device, of analyzing at least a time from when the action analysis device receives the trigger information till when the action analysis device starts to migrate, included in the migration information transmitted from the mobile terminal device;
an initiative actor identification step, performed by the action analysis device, of identifying the mobile terminal device of an initiative actor based on the analyzed action;
wherein the evacuation action is induced by transmitting and receiving action start information between users of the mobile terminal devices who are calling forth a same evacuation action; and
further comprising:
a current location acquisition step, performed by the mobile terminal device, to acquire a current location when the disaster occurrence information has been received, and
a route display control step, performed by the mobile terminal device, to display a route that leads from the acquired current location to a pre-registered evacuation site.

* * * * *